(12) United States Patent
Chen et al.

(10) Patent No.: US 9,024,903 B2
(45) Date of Patent: May 5, 2015

(54) CAPACITIVE TOUCH DEVICE AND DETECTION METHOD THEREOF

(71) Applicant: Novatek Microelectronics Corp., Hsinchu (TW)

(72) Inventors: Chun-Hung Chen, Taipei (TW); Yi-Rong Ko, Hsinchu (TW); Shun-Li Wang, Hsinchu (TW)

(73) Assignee: Novatek Microelectrics Corp., Hsinchu (TW)

( * ) Notice: Subject to any disclaimer, the term of this patent is extended or adjusted under 35 U.S.C. 154(b) by 58 days.

(21) Appl. No.: 13/938,687

(22) Filed: Jul. 10, 2013

(65) Prior Publication Data

US 2014/0015793 A1 Jan. 16, 2014

(30) Foreign Application Priority Data

Jul. 11, 2012 (TW) .............................. 101124980 A

(51) Int. Cl.
*G09G 5/00* (2006.01)
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ................................ G06F 3/044; G06F 3/0481
USPC ...................... 345/173–178; 178/18.01–18.06
See application file for complete search history.

(56) References Cited

U.S. PATENT DOCUMENTS

2012/0223911 A1* 9/2012 Westhues ...................... 345/174

* cited by examiner

*Primary Examiner* — Jennifer Nguyen
(74) *Attorney, Agent, or Firm* — Rabin & Berdo, P.C.

(57) ABSTRACT

A detection method for a capacitive touch device is provided. The detection method includes steps of: driving an $M^{th}$ driving line among an m driving lines of the capacitive touch device, wherein M is a natural number smaller than or equal to m and greater than 1; selecting a plurality of sensing lines among n sensing lines; obtaining a plurality of sensing values by detecting voltage changes at the selected sensing lines; determining whether to perform a noise reduction operation on the sensing values; if yes, calculating respective differences between the sensing values and a baseline value, and generating a noise correction value corresponding to the sensing values by performing a statistical computation on the differences; and correcting the differences according to the noise correction value.

9 Claims, 6 Drawing Sheets

CAPACITIVE TOUCH DEVICE AND DETECTION METHOD THEREOF

This application claims the benefit of Taiwan application Serial No. 101124980, filed Jul. 11, 2012, the subject matter of which is incorporated herein by reference.

BACKGROUND OF THE INVENTION

1. Field of the Invention

The invention relates to a capacitive touch device and a detecting method thereof.

2. Description of the Related Art

With a detection performed on a capacitive touch panel, a current capacitive touch device identifies whether the capacitive touch panel is touched according to a detection result, and accordingly determines a corresponding touch position or a control gesture. To enhance operation sensitivity, a detection result is thoroughly examined to distinguish minute differences. However, an actual operating environment of a capacitive touch device may be filled with noises, and so signal strength needs to be reinforced or noises need to be lowered in order to uphold a same signal-to-noise ratio (SNR) and to maintain desired operation sensitivity.

An exemplary approach for reinforcing the signal strength is accomplished by increasing a driving voltage. Common noises and a capacitive touch device jointly form a new electric field that becomes an influencing factor. Sources of an electric field include human static electricity, liquid crystal display (LCD) modules, power supplies, chargers and household appliances. For example, noise reduction can be implemented by means of synchronizing, shielding, filtering or grounding to reduce noises and thus maintain a preferred SNR.

However, all of the above signal reinforcement and noise reduction approaches demand extra costs, and may even further result in changes in an overall structure to lead to a failure in meeting a light and compact design target of a product.

SUMMARY OF THE INVENTION

According to an aspect of the present invention, a capacitive touch device is provided. The capacitive touch device includes a capacitive touch panel, a driving control unit, a conversion unit and a processing unit. The capacitive touch panel has a sensing point matrix formed by m driving lines and n sensing lines, where m and n are positive integers. The driving control unit, coupled to the m driving lines, sequentially provides m driving signals to the m driving lines in m corresponding driving periods, respectively. The conversion unit, coupled to the n sensing lines, performs conversion with reference to voltages at a plurality of sensing points corresponding to the n sensing lines in the m driving periods, respectively, to obtain n sensing values. The processing unit, coupled to the conversion unit, receives m×n sensing values in each of the m driving periods, and divides the m×n sensing values into a plurality of sensing value sets with reference to conversion time sequences of the m×n sensing values. As far as the sensing values of each of the sensing value sets are concerned, the sensing values are obtained through conversion at a substantially same time point. Regarding the sensing value sets as a basis, the processing unit respectively determines a plurality of noise correction values for the sensing value sets. The processing unit further corrects the sensing values of the sensing value sets according to the noise correction values to obtain m×n corrected sensing values.

According to another aspect of the present invention, a detection method for a capacitive touch device is provided. The capacitive touch device includes a capacitive touch panel, a driving control unit, a conversion unit and a processing unit. The capacitive touch panel has a sensing point matrix formed by m driving lines and n sensing lines, where m and n are positive integers. The detection method includes the following steps. An $m^{th}$ driving line among the m driving lines is driven by the driving control unit to cause a voltage change at a sensing point at the n sensing lines corresponding to the $m^{th}$ driving line, wherein M is a natural number smaller than or equal to m and greater than 1. A multipath transmission network in the conversion unit is driven by the processing unit to select some of the n sensing lines. Voltage changes at the selected sensing lines are detected by a plurality of analog-to-digital converters (ADCs) in the conversion unit to obtain a plurality of sensing values. It is then determined by the processing unit whether to perform a noise reduction operation on the sensing values. When the noise reduction operation is to be performed, respective differences between the sensing values and a baseline value are calculated by the processing unit. Next, according to the differences corresponding to the sensing values, a statistical computation is performed by the processing unit to generate a noise correction value corresponding to the sensing values. The differences are corrected according to the noise correction value by the processing unit, and the corrected differences are stored.

The above and other aspects of the invention will become better understood with regard to the following detailed description of the preferred but non-limiting embodiments. The following description is made with reference to the accompanying drawings.

DETAILED DESCRIPTION OF THE INVENTION

In a capacitive touch device and a detection method thereof according to embodiments of the present invention, a noise correction value is calculated according to a plurality of sensing values detected at a plurality of substantially similar time points, and a correction is accordingly performed on the sensing values obtained from the operation of the capacitive touch.

Figure 1:
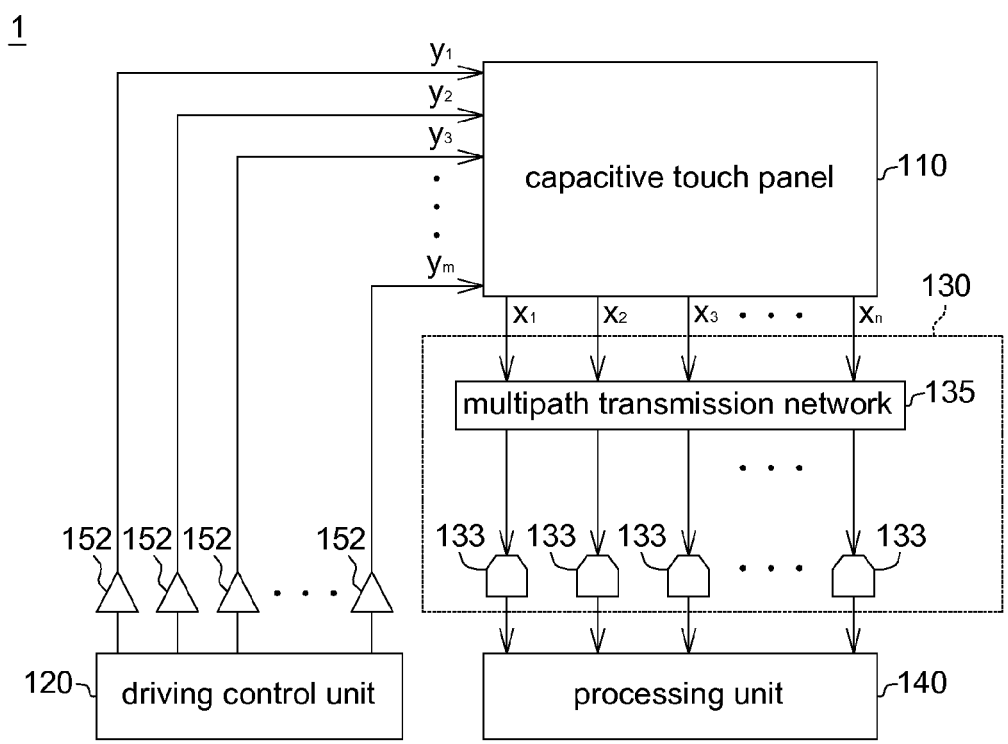
FIG. 1 is a block diagram of a capacitive touch device according to one embodiment.

FIG. 1 shows a block diagram of an exemplary capacitive touch device according to one embodiment. A capacitive touch device 1 includes a capacitive touch panel 110, a driving control unit 120, a conversion unit 130 and a processing unit 140. The capacitive touch panel 110 has a sensing point matrix formed by m driving lines $y_1$ to $y_m$ and n sensing lines $x_1$ to $x_n$, where m and n are positive integers.

Figure 2:
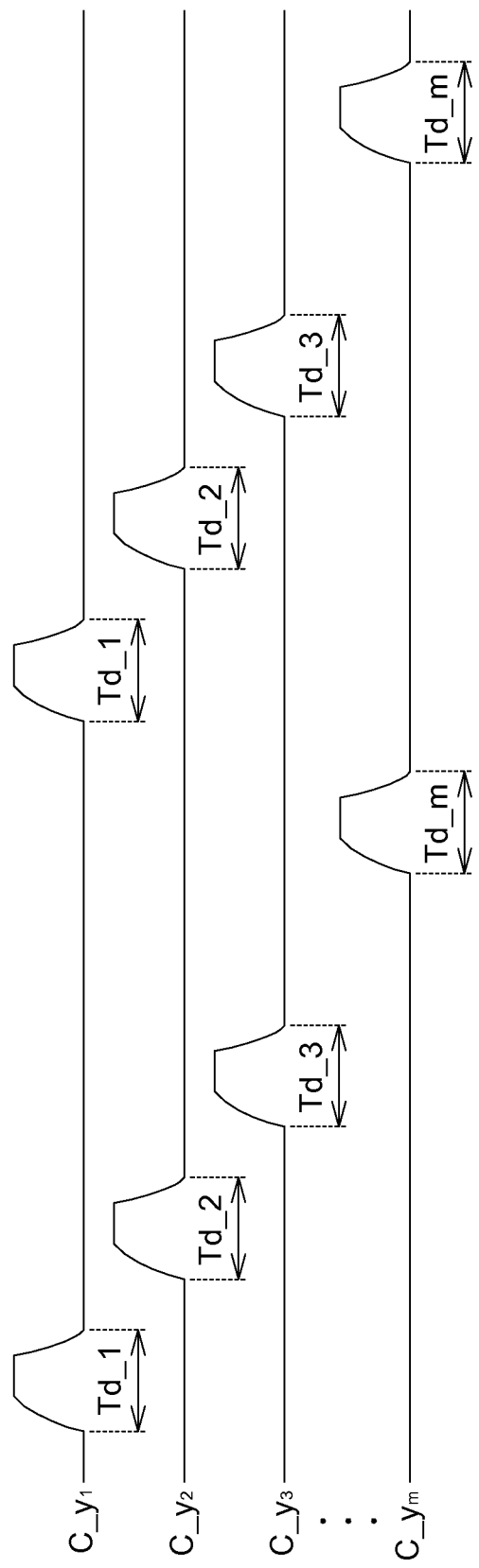
FIG. 2 is a timing diagram of signal waveforms at driving lines $y_1$ to $y_m$.

The driving control unit 120 is coupled to the m driving lines $y_1$ to $y_m$, and sequentially provides m driving signals to the m driving lines $y_1$ to $y_m$ in m driving periods Td_1 to Td_m, respectively. More than one cycle is presented in each of the m driving periods Td_1 to Td_m. The capacitive touch device 1 further includes m drivers 152. Through the m drivers 152, the driving control unit 120 is coupled to the m driving lines $y_1$ to $y_m$ by means of a programmable array logic to drive the m driving lines $y_1$ to $y_m$. For example, signal waveforms at the m driving lines $y_1$ to $y_m$ are as shown in FIG. 2.

Figure 3:
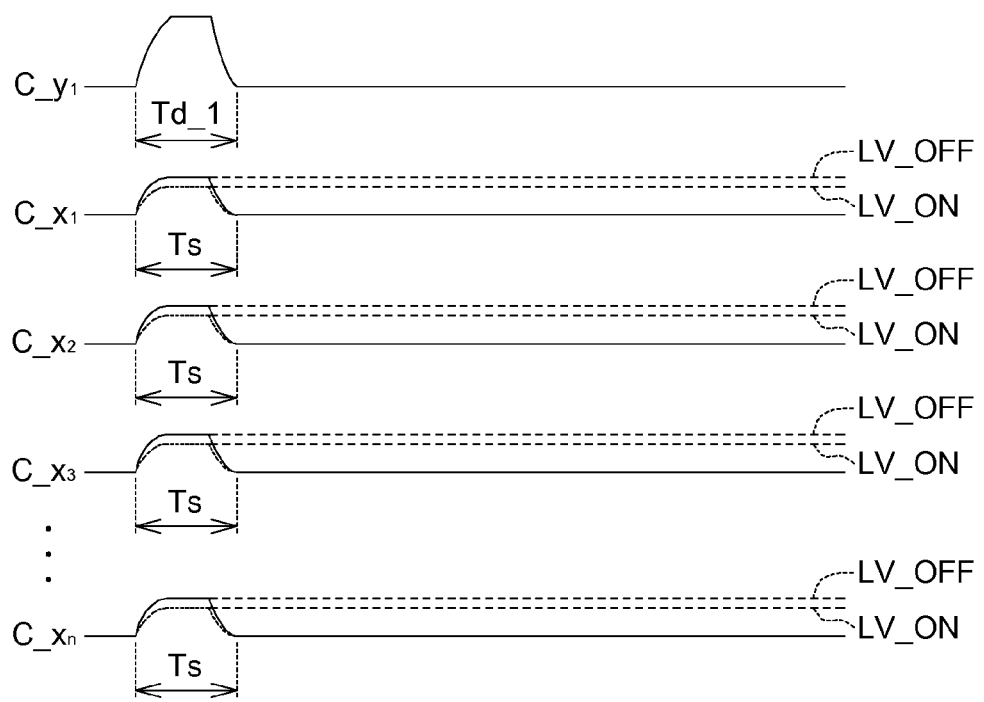
FIG. 3 is a timing diagram of signal waveforms at sensing lines $x_1$ to $x_n$.

For example, the conversion unit 130 is coupled to the n sensing lines $x_1$ to $x_n$ by means of a programmable array logic, and obtains n corresponding sensing values with reference to voltages at a plurality of sensing points corresponding to the n sensing lines $x_1$ to $x_n$ through conversion in the m driving periods Td_1 to Td_m, respectively. For example, voltage waveforms at the n sensing lines $x_1$ to $x_n$ are as shown in FIG. 3. In the driving period Td_1, a voltage signal is provided to the driving line $y_1$ to cause a level change at the corresponding sensing points at the sensing lines $x_1$ to $x_n$. The conversion unit 130 correspondingly detects the voltage changes at the sensing lines $x_1$ to $x_n$ to determine whether a finger touch event occurs at intersections of the sensing lines $x_1$ to $x_n$ and the driving line $y_1$. When the voltage at the sensing lines $x_1$ to $x_n$ correspond to a level LV_OFF, it means that no finger touch event is triggered. In contrast, when the voltage at the sensing lines $x_1$ to $x_n$ correspond to a level LV_ON, it means that a corresponding finger touch event is triggered.

Further, the conversion unit 130 includes a multipath transmission network 135 and k analog-to-digital converters (ADCs) 133, where k is an integer smaller than or equal to n. For example, the multipath transmission network 135 has n inputs and k outputs, with the n inputs respectively coupled to the n sensing lines $x_1$ to $x_n$, and the k outputs respectively coupled to the k ADCs 133. Through time-division multiplexing, the multipath transmission network 135 connects the n sensing lines $x_1$ to $x_n$ to the k ADCs 133, which then convert a voltage signal received to a sensing value. The sensing value is indicative of a capacitive sensing amount at the sensing point at each intersection of the driving lines and the sensing lines. For example, each of the k ADCs 133 includes an amplification sub-unit, an integration sub-unit, a filter sub-unit, a sample preservation unit and an ADC sub-unit.

For example, each of the m driving periods Td_1 to Td_m includes z sensing periods Ts_1 to Ts_z. In each of the sensing periods Ts_1 to Ts_z, the k ADCs 133 convert the voltages at the sensing points at k sensing lines selected from the n sensing lines $x_1$ to $x_n$ to obtain a sensing value set, where z is substantially equal to a ceiling function of a quotient of n divided by k, and each sensing value set includes a number smaller than or equal to k of sensing values. Taking a practical example for instance, n equals k. In other words, n equals to k, and z equals 1. Accordingly, each of the m driving periods Td_1 to Td_m includes one sensing period Ts. In the sensing period Ts, the k ADCs convert the voltages at the n sensing lines $x_1$ to $x_n$ to correspondingly obtain one sensing value set. Each sensing value set includes k sensing values.

In another example, n equals 2k+r. In other words, instead of being divisible by k, n leaves a remainder of r, where z equals 3 and r is a natural number smaller than k. Accordingly, each of the m driving periods Td_1 to Td_m correspondingly includes three sensing periods Ts_1 to Ts_3. In the three sensing periods Ts_1 to Ts_3, the k ADCs 133 respectively convert the voltages at the n sensing lines $x_1$ to $x_n$ to correspondingly obtain three sensing value sets. For example, the three sensing value sets respectively include k sensing values, k sensing values and r sensing values.

Thus, through operations of the k ADCs 133, the conversion unit 130 performs m×z data conversion operations for all of the sensing points in the entire sensing point matrix in the capacitive touch panel 110 in the m×z sensing periods to accordingly obtain m×z sensing value sets, i.e., m×n sensing values.

The processing unit 140, coupled to the k ADCs 133, senses the sensing point matrix by means of mutual sensing, and performs subsequent processing on the sensing values obtained from conversion of the k ADCs 133. For example, the driving control unit 120 and the processing unit 140 may substantially be integrated into a capacitance sensing integrated circuit (IC). For another example, the driving control unit 120 and the processing unit 140 may substantially be a driver circuit and a processor, respectively.

Ideally, the level at each of the m×n sensing points corresponds to the level LV_ON when a finger touch event is triggered, and corresponds to the level LV_OFF when a finger touch event is not triggered. However, in practice, noises often affect the voltage levels at the m×n sensing points. With the presence of noises in the sensing periods corresponding to the m×n sensing points, the voltage levels at the m×n sensing points become shifted, and fluctuating sensing values are also obtained by the conversion unit 130 based on the shifted voltage levels.

Figure 4:
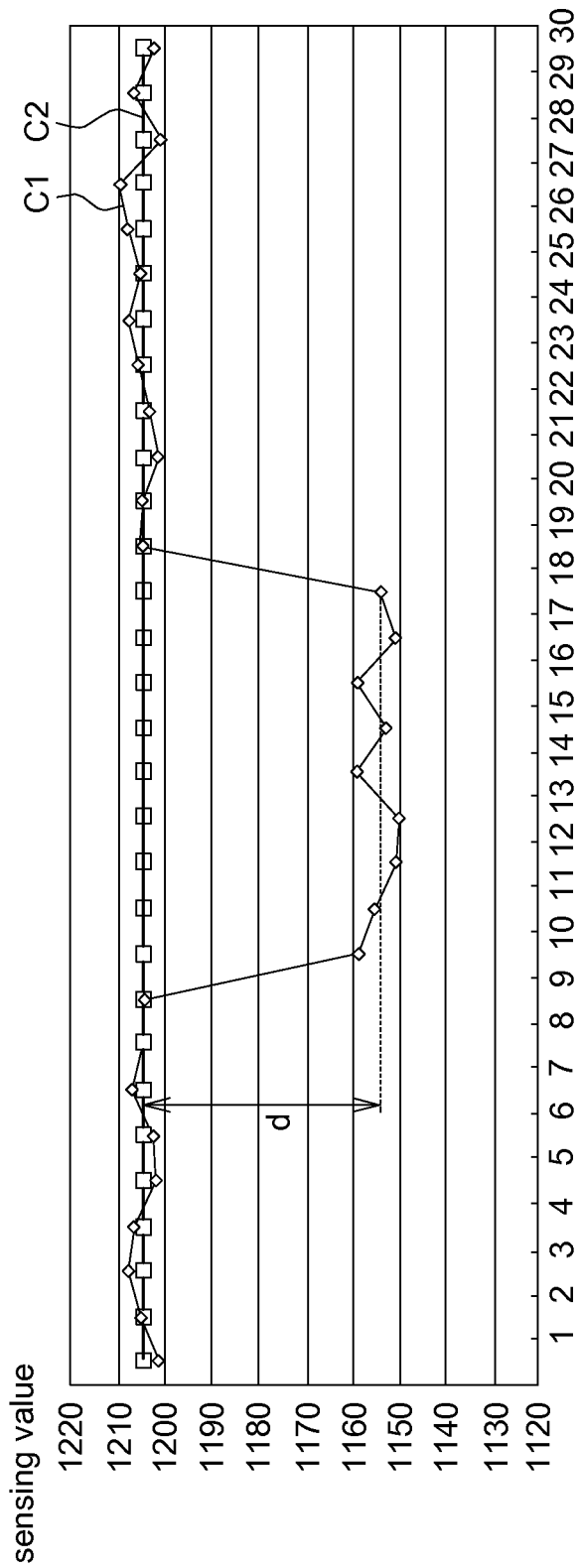
FIG. 4 shows a plurality of simulated values of a plurality of sensing values at an $(i, j)^{th}$ sensing point.

FIG. 4 shows a simulation diagram of a sensing value at an $(i,j)^{th}$ sensing point. Taking a practical example of instance, assume that the $(i,j)^{th}$ sensing point among the m×n sensing points has a baseline value (e.g., 1205). For the $(i,j)^{th}$ sensing point, sensing values converted and obtained from 30 consecutive scanning operations are as shown by a curve C1, and corresponding baseline values BL are as shown by a curve C2, where i and j are positive integers smaller than or equal to m and smaller than or equal to n. When a finger touch event is not triggered, the sensing value of the $(i,j)^{th}$ sensing point is affected by noises, such that the sensing value is shifted between a value range (e.g., 1200 to 1210) near the baseline value BL, as shown by $1^{st}$ to $9^{th}$ and $19^{th}$ to $30^{th}$ sensing values in FIG. 4. In contrast, when a finger touch event is triggered, as an equivalent capacitance value at the $(i,j)^{th}$ sensing point correspondingly lowers, a difference d between the baseline value BL and the respective sensing values is approximately equal to 50. Further, being affected by noises, the sensing value of the $(i,j)^{th}$ sensing point is shifted between a value range (e.g., 1150 to 1160) near the value 1155, as shown by $10^{th}$ to $18^{th}$ sensing values in FIG. 4.

In the operation example depicted in FIG. 4, a level (plus/minus 5) of the value shift resulted by noises is approximately equal to ⅒ of a level (minus 50) of the difference d. Therefore, the processing unit 140 may determine whether a finger touch event is triggered at the $(i,j)^{th}$ sensing point according to the size of the differences d between the baseline value BL and the respective sensing values. However, in an example where high-strength noises are present, it is much likely that the value shift resulted by the noises is close to the differences d between the baseline value BL and the respective sensing values. As such, the processing unit 140 may misjudge or incorrectly detect the finger touch event.

To overcome the misjudgment issue caused by high-strength noises, in one embodiment, the processing unit 140 identifies the sensing value sensed at substantially similar time points with reference to conversion time sequences of the m×n sensing values. In one embodiment, the processing unit 140 further performs a statistical computation according to the sensing value sensed at the substantially similar time points to determine a corresponding noise correction value dx, and accordingly corrects the sensing value sensed at the substantially similar time points. Thus, the processing unit 140 of the embodiment is capable of eliminating noise components in the m×n sensing values to implement a capacitive detection operation substantially having an anti-noise function.

Further, the processing unit 140 includes a processor and a storage device. The processor may be implemented by a microprocessor or a digital signal processor (DSP). The processing unit 140, coupled to the conversion unit 130, receives the m×z sensing value sets (each correspondingly includes m×n sensing values) in the m driving periods Td_1 to Td_m.

For example, in this embodiment, the conversion unit 130 obtains m×z sensing value sets in the m×z sensing periods, respectively. For each of the m×z sensing value sets, the sensing values are detected and obtained at a substantially same time. Accordingly, in the embodiment, for example, the processor calculates the difference d between each of the sensing values in each of the m×z sensing value sets and the baseline value BL on basis of the m×z sensing value sets. The processor further performs a statistical computation according to the differences corresponding to the m×z sensing value sets to generate corresponding noise correction values dx, respectively. The processor further corrects the differences d according to the noise correction values dx, and stores the corrected differences d' in the storage device.

In an operation example according to one embodiment, the parameter k equals 10, no finger touch event is triggered on the corresponding sensing lines, and the sensing values are affected by positive-polarity noises. Based on the above, simulated values of 10 sensing values obtained by the k ADCs 133, the baseline values, the differences d between the baseline value 1205 and the sensing values, the noise correction values dx and the corrected differences d' are as shown in Table-1.

TABLE 1

|  | #1 | #2 | #3 | #4 | #5 | #6 | #7 | #8 | #9 | #10 |
|---|---|---|---|---|---|---|---|---|---|---|
| BL | 1210 | 1210 | 1207 | 1211 | 1210 | 1208 | 1211 | 1215 | 1213 | 1212 |
| Sensing value | 1511 | 1513 | 1511 | 1509 | 1509 | 1508 | 1514 | 1505 | 1514 | 1505 |
| d | −301 | −303 | −304 | −298 | −299 | −300 | −303 | −290 | −301 | −293 |
| dx |  |  |  |  | −301 |  |  |  |  |  |
| d' | 0 | −2 | −3 | 3 | 2 | 1 | −2 | 11 | 0 | 8 |

In this example, the processor of the embodiment adopts a median selection statistical method to identify the median value (i.e., the value −301) of the differences d, and accordingly determines the value of the noise correction value dx. In the embodiment, the processor further subtracts the noise correction value dx from the differences d to obtain the corrected differences d', respectively.

Thus, even when the sensing values are affected by drastic positive-polarity noises, the processor according to the embodiment is still capable of identifying the value shifts of the sensing values resulted by the noises with reference to the median values of the differences d, and accordingly corrects the differences d.

In an operation example according to an alternative embodiment, the parameter k equals 10, and a finger touch event is triggered at the sensing line corresponding to the $5^{th}$ ADC. Based on the above conditions of the embodiment, simulated values of 10 sensing values obtained by the k ADCs 133, the baseline values, the differences d between the baseline value 1205 and the sensing values, the noise correction values dx and the corrected differences d' are as shown in Table-2.

TABLE 2

|  | #1 | #2 | #3 | #4 | #5 | #6 | #7 | #8 | #9 | #10 |
|---|---|---|---|---|---|---|---|---|---|---|
| BL | 1210 | 1210 | 1207 | 1211 | 1210 | 1208 | 1211 | 1215 | 1213 | 1212 |
| Sensing value | 1511 | 1513 | 1511 | 1509 | 1384 | 1508 | 1514 | 1505 | 1514 | 1505 |
| d | −301 | −303 | −304 | −298 | −174 | −300 | −303 | −290 | −301 | −293 |
| dx |  |  |  |  | −301 |  |  |  |  |  |
| d' | 0 | −2 | −3 | 3 | 127 | 1 | −2 | 11 | 0 | 8 |

In this example, the processor of the embodiment also adopts a median selection statistical method to identify the median value (i.e., the value −301) of the differences d, and accordingly determines the value of the noise correction value dx. In the embodiment, the processor further subtracts the noise correction value dx from the differences d from to obtain the corrected differences d', respectively. Thus, even when the sensing values are affected by drastic positive-polarity noises, the processor according to the embodiment is still capable of identifying the value shifts of the sensing values resulted by the noises with reference to the median values of the differences, and accordingly corrects the differences d.

In another example, assume that the sensing values are affected by negative-polarity noises, and a finger touch event is selectively triggered. In this operation example, simulated values of 10 sensing values obtained by the k ADCs 133, the baseline values, the differences d between the baseline value 1205 and the sensing values, the noise correction values dx and the corrected differences d' are as shown in Table-3 and Table-4.

TABLE 3

|  | #1 | #2 | #3 | #4 | #5 | #6 | #7 | #8 | #9 | #10 |
|---|---|---|---|---|---|---|---|---|---|---|
| BL | 1210 | 1210 | 1207 | 1211 | 1210 | 1208 | 1211 | 1215 | 1213 | 1212 |
| Sensing value | 711 | 713 | 711 | 709 | 709 | 708 | 714 | 705 | 714 | 705 |
| d | 499 | 497 | 496 | 502 | 501 | 500 | 497 | 510 | 499 | 507 |
| dx |  |  |  |  | 500 |  |  |  |  |  |
| d' | −1 | −3 | −4 | 2 | 1 | 0 | −3 | 10 | −1 | 7 |

TABLE 4

|  | #1 | #2 | #3 | #4 | #5 | #6 | #7 | #8 | #9 | #10 |
|---|---|---|---|---|---|---|---|---|---|---|
| BL | 1210 | 1210 | 1207 | 1211 | 1210 | 1208 | 1211 | 1215 | 1213 | 1212 |
| Sensing value | 711 | 713 | 711 | 709 | 584 | 708 | 714 | 705 | 714 | 705 |
| d | 499 | 497 | 496 | 502 | 626 | 500 | 497 | 510 | 499 | 507 |
| dx |  |  |  |  | 500 |  |  |  |  |  |
| d' | −1 | −3 | −4 | 2 | 126 | 0 | −3 | 10 | −1 | 7 |

Accordingly, even when the sensing values are affected by drastic negative-polarity noises, the processor according to the embodiment is still capable of identifying the value shifts of the sensing values resulted by the noises with reference to the median values of the differences d, and accordingly corrects the differences d.

In situations of Table-1 to Table-4 according to the embodiments, the median selection statistical method executed by the processor of the embodiment for identifying the noise correction value dx is described as an example for explaining embodiments. It should be noted that the processor of the embodiments is not limited to selecting the foregoing statistical method. Based on the same spirit, the processor of the embodiment may also employ a minimum selection statistical method, a mean calculation statistical method, a root-mean-square calculation statistical method, a median-average selection statistical method, an upper ordered-medians selection statistical method, a lower ordered-medians selection statistical method, or other similar statistical methods for determining the noise correction value dx.

Further, in the embodiments, the example of the processor 140 calculating the corresponding differences d, noise correction value dx and corrected differences d' based on the m×n sensing value sets, rather than a limitation to the present invention, is described for illustration purposes. In other embodiments, the processing unit 140 may also broaden determination conditions for selecting the sensing value sets. That is, the processing unit 140 may regard the sensing values of the sensing points at adjacent x rows in the sensing point matrix as sensing values sensed at substantially similar time points, where x is an arbitrary positive integer or a positive integer smaller than or equal to m.

Figure 5:
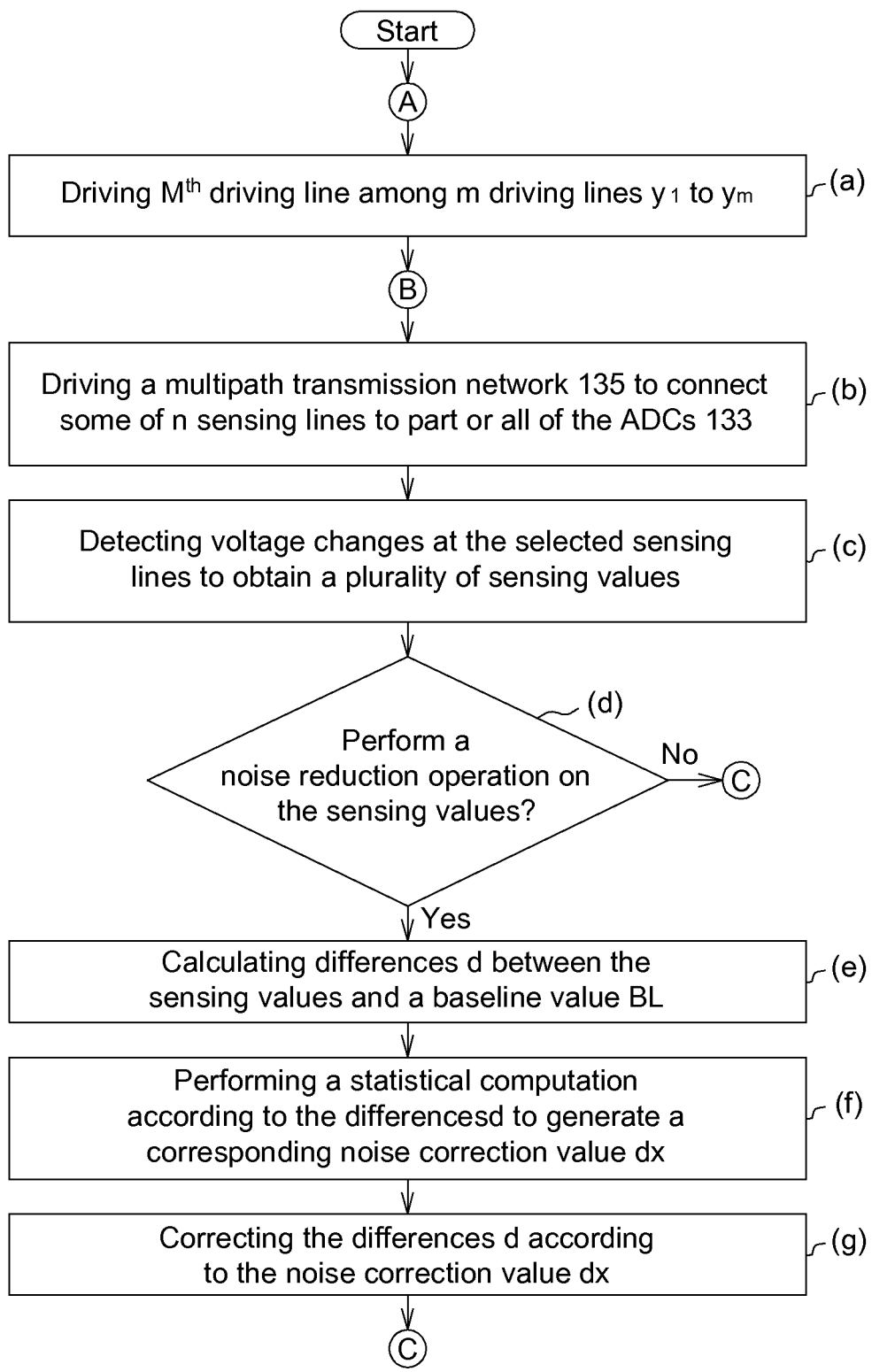
FIG. 5 is a flowchart of a detection method for a capacitive touch device according to one embodiment.

FIG. 5 shows a flowchart of a detection method for a capacitive touch device according to one embodiment. The detection method of the embodiment is applicable to the capacitive touch device 1, and includes the following steps. In step (a), the driving control unit 120 drives the $M^{th}$ driving line among the m driving lines $y_1$ to $y_m$ to cause a voltage change at the sensing point at the n sensing lines $x_1$ to $x_n$ corresponding to the $M^{th}$ driving line, where M is a natural number smaller than or equal to m and greater than 1. In step (b), the processing unit 140 drives the multipath transmission network 135 to select a plurality of sensing lines among the n sensing line, in a way that the selected sensing lines are connected with a part or all of the k ADCs 133.

In step (c), among the k ADCs 133, a plurality of ADCs connected with the selected sensing lines detect the voltage changes at the selected sensing lines to obtain a plurality of sensing values. In step (d), the processing unit 140 determines whether to perform a noise reduction operation on the sensing values. When the noise reduction operation is to be performed on the sensing values, step (e) is performed. In step (e), the processing unit 140 calculates differences between the sensing values and the baseline value BL, respectively. In step (f), the processing unit 140 performs a statistical computation according to a plurality of differences corresponding to the sensing values to generate a noise correction value dx corresponding to the sensing values. In step (g), the processing unit 140 corrects the differences d according to the noise correction value dx, and stores the corrected differences d'.

Figure 6:
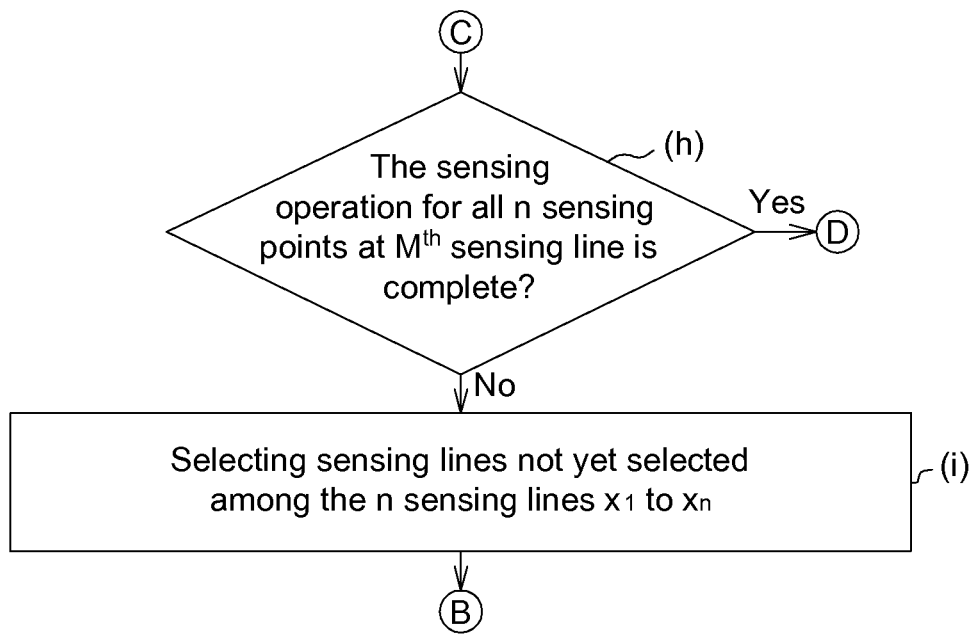
FIG. 6 is a flowchart of a partial process of a detection method for a capacitive touch device according to one embodiment.

FIG. 6 shows a flowchart of a partial process of a detection method for a capacitive touch device according to one embodiment. After step (d), step (h) is performed when the noise reduction operation is not to be performed on the sensing values. In step (h), the processing unit 140 determines whether the sensing operation for all of the n sensing points with respect to the $M^{th}$ driving line is complete. When the sensing operation for all of the n sensing points with respect to the $M^{th}$ driving line is incomplete, step (i) is performed, in which the processing unit 140 drives the multipath transmission network 135 to select another sensing line that is not yet selected among the n sensing lines $x_1$ to $x_n$. In the detection method according to one embodiment, step (b) is iterated after step (i) to perform the sensing operation on the sensing points corresponding to other sensing lines with respect to the $M^{th}$ driving line.

Figure 7:
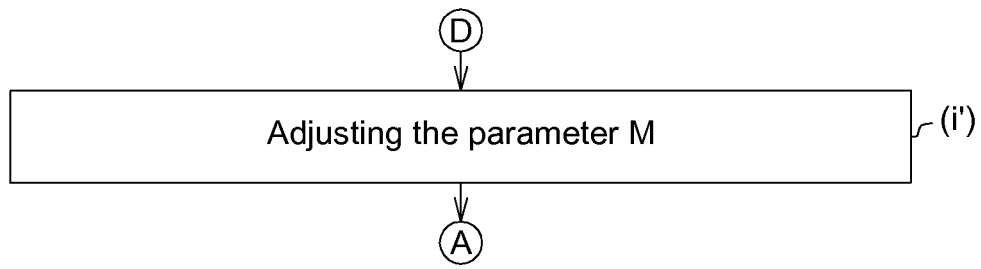
FIG. 7 is a flowchart of a partial process of a detection method for a capacitive touch device according to one embodiment.

FIG. 7 shows a flowchart of a partial process of a detection method for a capacitive touch device according to one embodiment. In the embodiment, when the sensing operation for all the n sensing points on the $M^{th}$ driving line is complete after step (h), step (i') is performed. In step (i'), the processing unit 140 adjusts the parameter M. For example, the processing unit 140 determines whether the parameter M is equal to m. When the parameter M is not equal to m, the parameter M is added by 1. In the detection method according to the embodiment, step (a) is iterated after step (i') to perform the sensing operation on the sensing points corresponding to the remaining sensing lines at the $M^{th}$ driving line.

Again referring to FIG. 5, for example, the detection method according to one embodiment performs steps (h), (i) and (i') after step (g), so as to determine whether to perform corresponding operations on other sensing values after completing the noise reduction operation for the current sensing values.

In the capacitive touch device and detection method thereof according to the above embodiments, in the capacitive sensing operation of the capacitive touch device, among the sensing point matrix, the processing unit identifies a plurality of sensing points sensed at substantially similar time points, and identifies the corresponding sensing values. In the capacitive touch device and detection method thereof according to the above embodiments, the processing unit further determines a noise correction value on the basis of the sensing values. In the capacitive touch device and detection method thereof according to the above embodiments, the processing unit further corrects the sensing values according to the noise correction value to generate the corrected sensing values. Therefore, compared to a conventional capacitive touch device, the capacitive touch device and detection method thereof according to the above embodiments are advantaged by substantially implementing an anti-noise function.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A capacitive touch device, comprising:
 a capacitive touch panel, comprising a sensing point matrix formed by m driving lines and n sensing lines, m and n being positive integers;
 a driving control unit, coupled to the m driving lines, for sequentially providing m driving signals to the m driving lines in m corresponding driving periods, respectively;
 a conversion unit, coupled to the n sensing lines, for obtaining n sensing values through conversion with reference to voltages at a plurality of sensing points corresponding to the n sensing lines in the m corresponding driving periods, respectively; and
 a processing unit, coupled to the conversion unit, for receiving the m×n sensing values in each of the m driving periods, and dividing the m×n sensing values into a plurality of sensing value sets with reference to conversion time sequences of the m×n number of sensing values; the sensing values in each of the sensing value sets being substantially obtained at a substantially same time point through the conversion unit;
 wherein, the processing unit calculates a difference between each of the sensing values in each of the sensing value sets and a baseline value, performs a statistical computation according to the differences corresponding to the sensing value sets to generate a plurality of noise correction values, and further corrects the sensing values of each of the sensing value sets according to the noise correction values to obtain m×n corrected sensing values.

2. The capacitive touch device according to claim 1, wherein the conversion unit comprises:
 a multipath transmission network, comprising n inputs and k outputs; the n inputs being coupled to the n sensing lines, respectively, k being an integer smaller than or equal to n; and
 k analog-to-digital converters (ADCs), coupled to the k outputs, respectively; and
 each of the m driving periods further comprises z sensing periods; the k ADCs convert voltages at a plurality of sensing points corresponding to the n sensing lines in each of the z sensing periods to obtain one of the sensing value sets; z is substantially equal to a ceiling function of a quotient of n divided by k; and each of the sensing value sets comprises a number smaller than or equal to k of sensing values.

3. The capacitive touch device according to claim 2, wherein the processing unit sequentially receives each of the sensing value sets provided by the k ADCs, calculates a difference between each of the sensing values in each sensing value set and a baseline value, performs a statistical computation according to the differences corresponding to each sensing value set to generate a noise correction value corresponding to each sensing value set, corrects the differences according to the noise correction value, and stores the corrected differences.

4. The capacitive touch device according to claim 3, wherein the statistical computation is a selection of a minimum, a median, a value which is upper or lower than the median, an average of a plurality of values upper and lower than the median, or a mean.

5. A detection method for a capacitive touch device; the capacitive touch device comprising a capacitive touch panel, a driving control unit, a conversion unit and a processing unit; the capacitive touch panel comprising a sensing point matrix formed by m driving lines and n sensing lines, the driving control unit being coupled to the m driving lines, the conversion unit being coupled to the n sensing lines, the processing unit being coupled to the conversion unit, m and n being positive integers; the detection method comprising:
 a) driving an $M^{th}$ driving line among the m driving lines by the driving control unit to cause a voltage change at a sensing point at the $n^{th}$ sensing line corresponding to the $M^{th}$ driving line; wherein M is a natural number smaller than or equal to m and greater than 1;
 b) driving a multipath transmission network in the conversion unit by the processing unit to select some of the n sensing lines;
 c) detecting voltage changes at the selected sensing lines by a plurality of ADCs in the conversion unit to obtain a plurality of sensing values;
 d) determining by the processing unit whether to perform a noise reduction operation on the sensing values;
 e) calculating a difference between each of the sensing values and a baseline value by the processing unit when it is determined to perform the noise reduction operation on the sensing values;
 f) performing a statistical computation according to the differences corresponding to the sensing values to generate a noise correction value corresponding to the sensing values by the processing unit; and
 g) correcting the differences according to the noise correction value and storing the corrected differences by the processing unit.

6. The detection method according to claim 5, further comprising:
 h) determining by the processing unit whether a sensing operation for all of the n sensing points at the $M^{th}$ driving line is complete when it is determined not to perform the noise reduction operation on the sensing values;
i) driving the multipath transmission network by the processing unit to select a plurality of sensing lines not yet selected among the n sensing lines when the sensing operation for all of the sensing points at the $M^{th}$ driving line is incomplete; and
iterating step (b) after step (i).

7. The detection method according to claim 6, further comprising:
i') adjusting the parameter M by the processor unit when the sensing operation for all of the sensing points at the $M^{th}$ driving line is complete; and
iterating step (a) after step (i').

8. The detection method according to claim 5, after step (g), further comprising:
h) determining by the processing unit whether a sensing operation for all of the n sensing points at the $M^{th}$ driving line is complete;
i) driving the multipath transmission network by the processing unit to select a plurality of sensing lines not yet selected among the n sensing lines when the sensing operation for all of the sensing points at the $M^{th}$ driving line is incomplete; and
iterating step (b) after step (i).

9. The detection method according to claim 8, further comprising:
i') adjusting the parameter M by the processor unit when the sensing operation for all of the sensing points at the $M^{th}$ driving line is complete; and
iterating step (a) after step (i').

* * * * *